US012106872B2

(12) United States Patent
Tsai

(10) Patent No.: US 12,106,872 B2
(45) Date of Patent: Oct. 1, 2024

(54) FLAT COMBINED WIRE

(71) Applicants: DING TAI FENG ELECTRIC WIRE AND CABLE IND. CO., LTD., Taoyuan (TW); I-Chieh Tsai, Taoyuan (TW)

(72) Inventor: I-Chieh Tsai, Taoyuan (TW)

(73) Assignees: I-Chieh Tsai, Taoyuan (TW); DING TAI FENG ELECTRIC WIRE AND CABLE IND. CO., LTD., Taoyuan (TW)

( * ) Notice: Subject to any disclaimer, the term of this patent is extended or adjusted under 35 U.S.C. 154(b) by 0 days.

(21) Appl. No.: 17/892,113

(22) Filed: Aug. 21, 2022

(65) Prior Publication Data

US 2023/0059723 A1 Feb. 23, 2023

(30) Foreign Application Priority Data

Aug. 23, 2021 (TW) ................................ 110131158

(51) Int. Cl.
*H01B 7/08* (2006.01)
*H01B 7/18* (2006.01)

(52) U.S. Cl.
CPC ............ *H01B 7/08* (2013.01); *H01B 7/1825* (2013.01)

(58) Field of Classification Search
CPC ........................................................ H01B 7/08
See application file for complete search history.

(56) References Cited

U.S. PATENT DOCUMENTS 1,688,303 A * 10/1928 Carpenter ................ H01B 5/12 174/128.1
2,004,592 A * 6/1935 Alden ...................... H01B 7/04 174/121 R
5,245,134 A * 9/1993 Vana, Jr. ............. H01B 11/203 385/112
5,486,654 A * 1/1996 Hanak .................. H01B 7/0876 174/117 F
8,969,724 B2 * 3/2015 Tatsumi ................ H01B 11/02 385/100
2003/0141101 A1 * 7/2003 Mima .................... H01B 7/306 174/128.1

(Continued)

FOREIGN PATENT DOCUMENTS

CN 101295564 10/2008
CN 102103902 6/2011

(Continued)

OTHER PUBLICATIONS

"Office Action of Taiwan Counterpart Application", issued on Dec. 20, 2022, p. 1-p. 6.

(Continued)

*Primary Examiner* — Chau N Nguyen
(74) *Attorney, Agent, or Firm* — JCIPRNET

(57) ABSTRACT

A flat combined wire including at least two wires combined side by side with each other is provided. Each of the wires includes at least three cores and an electrically insulating member. Each of the cores includes multiple yarns and multiple electrically conducting wires twisted and woven with each other, and the electrically conducting wires are wrapped around the yarns. The electrically insulating member covers the cores.

10 Claims, 4 Drawing Sheets

(56) References Cited

U.S. PATENT DOCUMENTS

| | | | | |
|---|---|---|---|---|
| 2008/0282665 | A1* | 11/2008 | Speelers ................ | D02G 3/328<br>57/212 |
| 2010/0084179 | A1* | 4/2010 | Harris .................. | D03D 1/0043<br>174/126.1 |
| 2011/0174517 | A1* | 7/2011 | Al-Ali ................ | A61B 5/14551<br>174/113 R |
| 2014/0262478 | A1* | 9/2014 | Harris .................. | D03D 15/567<br>139/420 R |
| 2019/0318844 | A1* | 10/2019 | Yamazaki ............ | H04R 1/1033 |

FOREIGN PATENT DOCUMENTS

| | | |
|---|---|---|
| CN | 106229042 | 12/2016 |
| CN | 112259284 | 1/2021 |
| JP | S52169783 | 12/1977 |
| JP | S57043513 | 3/1982 |
| JP | 2008269799 | 11/2008 |
| WO | 2009157070 | 12/2009 |

OTHER PUBLICATIONS

"Office Action of Japan Counterpart Application", issued on Nov. 14, 2023, with English translation thereof, p. 1-p. 6.

"Office Action of Japan Counterpart Application", issued on Jun. 4, 2024, with English translation thereof, p. 1-p. 6.

"Office Action of Korea Counterpart Application", issued on May 3, 2024, with English translation thereof, p. 1-p. 8.

* cited by examiner

110 {111
112}

FLAT COMBINED WIRE

CROSS-REFERENCE TO RELATED APPLICATION

This application claims the priority benefit of Taiwan application serial no. 110131158, filed on Aug. 23, 2021. The entirety of the above-mentioned patent application is hereby incorporated by reference herein and made a part of this specification.

BACKGROUND

Technical Field

The disclosure relates to a flat combined wire.

Description of Related Art

Generally speaking, a transmission cable can be used as a medium for electrical connection between two electronic devices, so as to facilitate stable operations of expected signal transmission. With the increasing prevalence of automated factories and artificial intelligence machines, it means that the required transmission cables will also increase.

It is worth noting that most of these related mechanical equipment belong to dynamic manufacturing equipment, so the transmission cables used must also meet the requirements of wiring of moving parts, such as the capability to withstand repeated U-bending.

The above requirements are relatively easy to achieve for a single coaxial cable. However, with the increase in information transmission volume and transmission speed, these mechanical equipment often need to be changed to flat combined wires to meet the control requirements of the mechanical equipment, and the existing flat combined wires are obviously unable to meet the above-mentioned capability requirements.

SUMMARY

The disclosure provides a flat combined wire, and the core structure of the flat combined wire has flexure resistance and meets the requirements of the wiring of moving parts.

The flat combined wire of the disclosure includes at least two wires combined side by side with each other. Each of the wires includes at least three cores and an electrically insulating member. Each of the cores includes multiple yarns and multiple electrically conducting wires twisted and woven with each other, and the electrically conducting wires are wrapped around the yarns. The electrically insulating member covers the cores.

In an embodiment of the disclosure, the above-mentioned electrically conducting wire is a bare copper wire or a bare copper wire with an outer coating.

In an embodiment of the disclosure, the above-mentioned cores are distributed at an equal angle relative to a central axis of the above-mentioned wire in the electrically insulating member.

In an embodiment of the disclosure, the outer diameter of each of the above-mentioned wires is 0.5 mm to 2.5 mm.

In an embodiment of the disclosure, the outer diameter of each of the above-mentioned wires is 1.725 mm to 1.745 mm.

In an embodiment of the disclosure, the thickness of the above-mentioned electrically insulating member is 0.2 mm to 0.6 mm.

In an embodiment of the disclosure, the outer diameter of each of the above-mentioned cores is 0.5 mm to 0.6 mm.

In an embodiment of the disclosure, the width of the above-mentioned flat combined wire is 4.8 mm to 10 mm.

In an embodiment of the disclosure, the width of the above-mentioned flat combined wire is 6.9 mm to 6.98 mm.

In an embodiment of the disclosure, the flexure resistance of each of the above-mentioned wires is that the number of dynamic bending times is greater than ten million times, and a radius of curvature of the bending is 0.5 mm to 30 mm.

Based on the above, the flat combined wire is formed by combining at least two wires side by side with each other. Each of the wires includes at least three cores and an electrically insulating member. The electrically insulating member covers the cores, each of the cores includes multiple yarns and multiple electrically conducting wires twisted and woven with each other, and the electrically conducting wires are wrapped around the yarns. Accordingly, for the core, by using the yarns with extensibility and toughness as the central structure, the structural strength of the core can be increased and the toughness thereof can be improved. Furthermore, the wire composed of at least three cores can make the wire have the aforementioned characteristics. Moreover, the flat combined wire formed by combining multiple wires side by side can have higher resistance to flexure due to the aforementioned characteristics, and thus can withstand the operating situation of dynamic repeated bending, which can meet the requirements of modern production lines.

DESCRIPTION OF THE EMBODIMENTS

Figure 1:
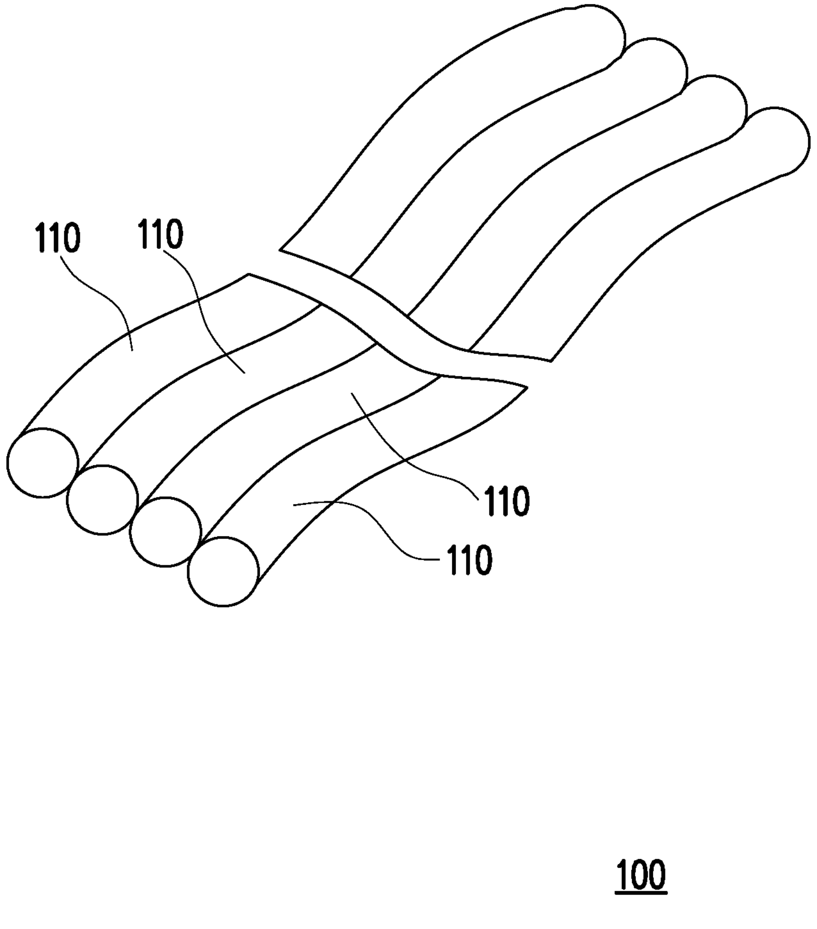
FIG. 1 is a partial schematic diagram of a flat combined wire according to an embodiment of the disclosure.
Figure 2:
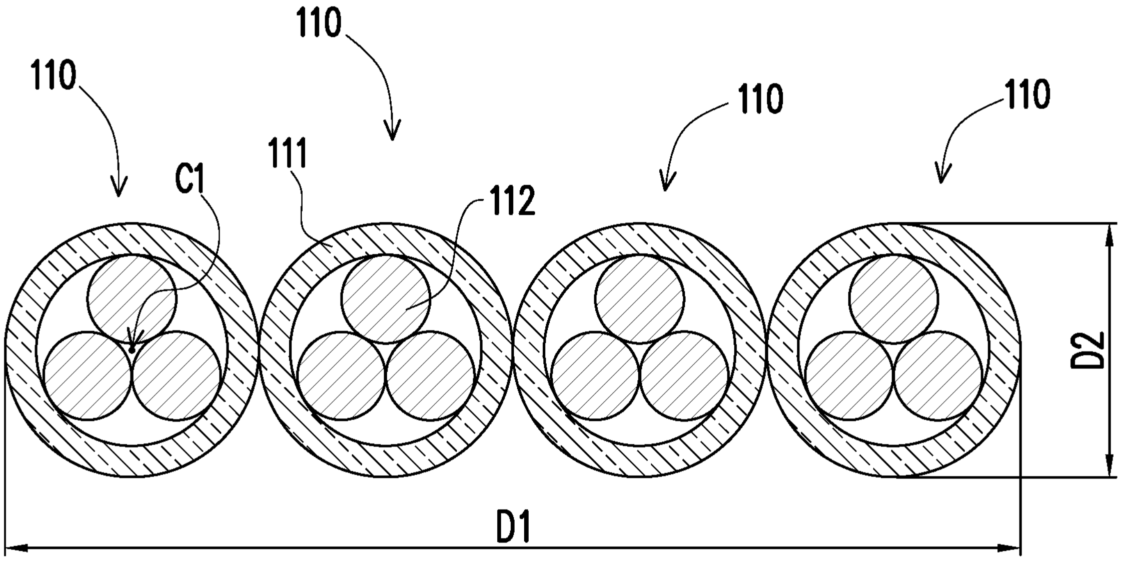
FIG. 2 is a cross-sectional view of the flat combined wire of FIG. 1.

FIG. 1 is a partial schematic diagram of a flat combined wire according to an embodiment of the disclosure. FIG. 2 is a cross-sectional view of the flat combined wire of FIG. 1. Please refer to FIGS. 1 and 2 at the same time. In the embodiment, a flat combined wire 100 includes at least two wires 110 that are combined side by side with each other. Here, the four wires 110 are taken as an example. These wires 110 are combined side by side by hot pressing or the like, as shown in FIG. 1, and the four wires 110 shown are substantially coplanar.

Figure 3:
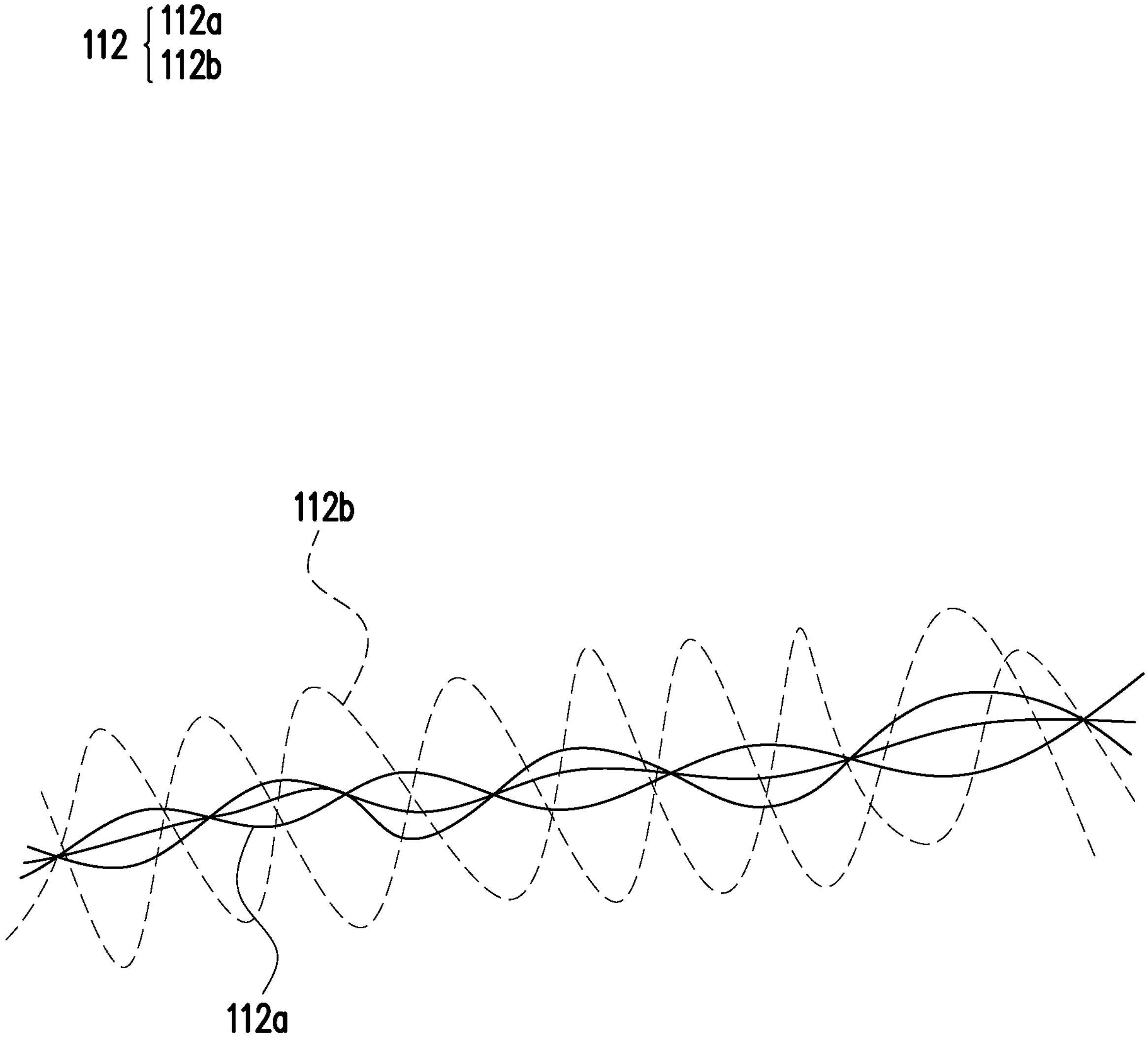
FIG. 3 is a schematic diagram of components of the core of FIG. 2.

FIG. 3 is a schematic diagram of components of the core of FIG. 2. Please refer to FIGS. 2 and 3 at the same time. In the embodiment, each of the wires 110 includes at least three cores 112 and an electrically insulating member 111. The electrically insulating member 111 covers the cores 112 to protect the cores 112. The bonding parameters between the electrically insulating member 111 and the core 112 may be appropriately adjusted to adjust the relative position between the two. In another embodiment, the electrically insulating member 111 may cover the outer surface of the cores 112 without gaps. The aforementioned hot pressing is for the electrically insulating member 111, so that the adjacent electrically insulating members 111 may be combined side by side with each other. Furthermore, the electrically insulating member 111 is selected from materials that do not drop chips to facilitate the use of the flat combined wire 100 in an environment such as a clean room. In addition, each of the cores 112 includes multiple yarns 112*a* and multiple electrically conducting wires 112*b* twisted and woven with each other. Here, the yarn 112*a* is, for example, polyurethane fiber, which has better tension and toughness. After the yarns 112*a* are twisted and woven, the central structure of the core 112 is formed, which can effectively allow the physical properties of the yarn 112*a* to be directly reflected on the core 112, that is, the core 112 has the resistance to withstand dynamic bending.

The electrically conducting wire 112*b* is a bare copper wire or a bare copper wire with an outer coating (for example, a tinned copper wire, that is, the outer surface of the bare copper wire has a metal coating). Here, the form of the electrically conducting wire 112*b* may be determined by selecting a corresponding copper material according to the usage state, required structural strength, and impedance. Furthermore, the electrically conducting wires 112*b* are twisted and wrapped around the outer periphery of the yarns 112*a* as a medium for electrical transmission. However, since the electrically conducting wires 112*b* are substantially attached to the outside of the yarns 112*a*, in terms of structural composition, the electrically conducting wires 112*b* do not need to bear too much stress generated by dynamic bending, and can also increase the service life of the electrically conducting wires accordingly.

Referring to FIG. 2 again, in the embodiment, an outer diameter D2 of each of the wires 110 is 0.5 mm to 2.5 mm, and the more preferable one is 1.725 mm to 1.745 mm. The thickness of the electrically insulating member 111 is 0.2 mm to 0.6 mm. The outer diameter of each of the cores 112 is 0.5 mm to 0.6 mm. Accordingly, when the four wires 110 are combined to form the flat combined wire 100, a width D1 of the flat combined wire 100 is 4.8 mm to 10 mm, and the more preferable one is 6.9 mm to 6.98 mm. The flat combined wire 100 shown in this way can be applied to different moving parts of various automatic machines and occupies less space. Moreover, due to the characteristics of the aforementioned core 112, the flat combined wire 100 can freely deform and keep its shape while maintaining the planar shape.

Referring to FIG. 2 again, it should also be mentioned here that the cores 112 of the embodiment are distributed at an equal angle relative to a central axis C1 of the wire 110 in the electrically insulating member 111. Since three cores 112 are shown here, the axes of any two adjacent cores 112 have a central angle of 120 degrees relative to the central axis C1. This allows the cores 112 to share the stress close to each other when the wire 110 is in a dynamic bending state, so as not to cause stress concentration to cause damage to the wire 110. In addition, the number of cores 112 in one wire 110 may be selected from 3 to 7 cores under the premise that the range of the outer diameter D2 (1.2 mm to 2.5 mm) of the wire 110 is satisfied.

Figure 4:
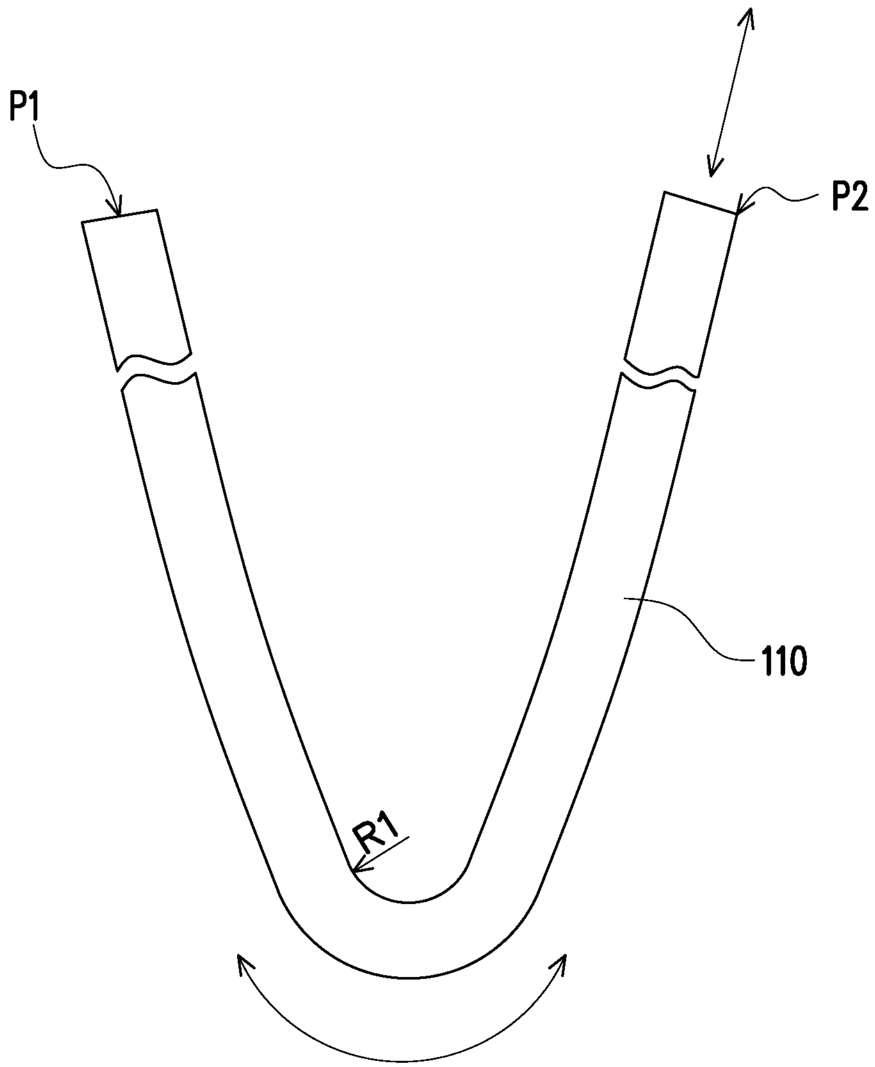
FIG. 4 is a simple schematic diagram of the flat combined wire of FIG. 1 performing a bending resistance test.

FIG. 4 is a simple schematic diagram of the flat combined wire of FIG. 1 performing a bending resistance test. Referring to FIG. 4, due to the aforementioned component characteristics, the flexure resistance of each of the wires 110 in the embodiment is that the number of dynamic bending times is greater than ten million times, a radius of curvature R1 of the bending is 0.5 mm to 30 mm, and the bending may be U-shaped bending or V-shaped bending. In this way, the flat combined wire 100 can withstand the operating environment of repeated dynamic bending. Taking the wire 110 shown in FIG. 4 as an example, one end P1 is a fixed end, and the other end P2 is a moving end, which represents the reciprocating movement of the automation equipment during operation, so that bends are formed in at least partial area of the wire 110, and as the time sequence increases, the bends are formed in different parts.

To sum up, in the above embodiment of the disclosure, the flat combined wire is formed by combining at least two wires side by side with each other. Each of the wires includes at least three cores and an electrically insulating member. The electrically insulating member covers the cores, each of the cores includes multiple yarns and multiple electrically conducting wires twisted and woven with each other, and the electrically conducting wires are wrapped around the yarns. Accordingly, for the core, by using the yarns with extensibility and toughness as the central structure, the structural strength of the core can be increased and the toughness thereof can be improved. Furthermore, the wire composed of at least three cores can make the wire have the aforementioned characteristics. Therefore, the flat combined wire formed by combining multiple wires side by side can have higher resistance to flexure due to the aforementioned characteristics, and thus can withstand the operating situation of dynamic repeated bending, which can meet the requirements of modern production lines.

In other words, the flat combined wire of the disclosure gathers multiple combined wires, and due to the aforementioned characteristics of the core, the flat combined wire has a large degree of freedom in the direction of bendability or flexibility, and has high resilience. Therefore, the flat combined wire can be freely bent or folded along with the moving parts of the automation equipment, and can easily return to the original undeformed flat combined wire during the reciprocating movement.

What is claimed is:

1. A flat combined wire, comprising:
- at least two wires combined side by side with each other, and each of the wires comprising:
- at least three cores, and each of the cores comprising a plurality of yarns and a plurality of electrically conducting wires, wherein
- the yarns are twisted and woven with each other to be a central structure of each of the cores,
- the yarns are interwoven with the electrically conducting wires, and
- the electrically conducting wires pass through spaces between the yarns and wrap around the yarns; and
- an electrically insulating member, covering the cores,
- wherein two of the electrically insulating members of the two wires combined side by side are hot pressed together, wherein the yarns are polyurethane fibers.

2. The flat combined wire according to claim 1, wherein each of the plurality of electrically conducting wires is a bare copper wire or a bare copper wire with an outer coating.

3. The flat combined wire according to claim 1, wherein the cores are distributed at an equal angle relative to a central axis of the wire in the electrically insulating member.

4. The flat combined wire according to claim 1, wherein an outer diameter of each of the wires is 0.5 mm to 2.5 mm.

5. The flat combined wire according to claim 1, wherein an outer diameter of each of the wires is 1.725 mm to 1.745 mm.

6. The flat combined wire according to claim 1, wherein a thickness of the electrically insulating member is 0.2 mm to 0.6 mm.

7. The flat combined wire according to claim 1, wherein an outer diameter of each of the cores is 0.5 mm to 0.6 mm.

8. The flat combined wire according to claim 1, wherein a width of the flat combined wire is 4.8 mm to 10 mm.

9. The flat combined wire according to claim 1, wherein a width of the flat combined wire is 6.9 mm to 6.98 mm.

10. The flat combined wire according to claim 1, wherein flexure resistance of each of the wires is that a number of dynamic bending times is greater than ten million times, and a radius of curvature of the bending is 0.5 mm to 30 mm.

* * * * *